(12) United States Patent
Lee

(10) Patent No.: US 8,342,698 B2
(45) Date of Patent: Jan. 1, 2013

(54) FOCUSING DEVICE FOR BEAM PROJECTOR

(75) Inventor: Dong-Hi Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 225 days.

(21) Appl. No.: 12/707,391

(22) Filed: Feb. 17, 2010

(65) Prior Publication Data

US 2010/0208219 A1   Aug. 19, 2010

(30) Foreign Application Priority Data

Feb. 17, 2009 (KR) .................. 10-2009-0012864

(51) Int. Cl.
*G03B 21/14* (2006.01)

(52) U.S. Cl. ...................................... 353/101

(58) Field of Classification Search .......... 353/100, 353/101; 359/144, 826, 822, 823
See application file for complete search history.

(56) References Cited

U.S. PATENT DOCUMENTS

| 3,122,079 | A | * | 2/1964 | Mahn | 396/144 |
| 4,122,466 | A | | 10/1978 | Iwata | |
| 2006/0256303 | A1 | * | 11/2006 | Hamada | 353/101 |
| 2007/0064205 | A1 | | 3/2007 | Meng et al. | |

FOREIGN PATENT DOCUMENTS

KR   20-2008-0005528   11/2008

* cited by examiner

*Primary Examiner* — Thanh Luu
*Assistant Examiner* — Danell L Owens
(74) *Attorney, Agent, or Firm* — The Farrell Law Firm, P.C.

(57) ABSTRACT

Disclosed is a focusing device for a beam projector, which includes an adjustment member mounted on a housing of the beam projector to be linearly movable, a pivoting member rotatably mounted on the housing, a link member extending from the pivoting member at a point separated from a rotation axis of the pivoting member, and a lens assembly mounted to be linearly movable within the housing while interfering with the pivoting member, in which the link member rotates the pivoting member according to the linear movement of the adjustment member and the lens assembly linearly moves within the housing according to the rotation of the pivoting member. The focusing device can perform fine focusing and adjust the focusing distance without using a gear or motor to make the beam projector compact and mount the beam projector on the portable terminal.

11 Claims, 3 Drawing Sheets

FOCUSING DEVICE FOR BEAM PROJECTOR

PRIORITY

This application claims priority under 35 U.S.C. §119(a) to a Korean Patent Application entitled "Focusing Device for Beam Projector" filed in the Korean Industrial Property Office on Feb. 17, 2009 and assigned Serial No. 10-2009-0012864, the contents of which are incorporated herein by reference.

BACKGROUND OF THE INVENTION

1. Field of the Invention

The present invention relates generally to a beam projector, and more particularly to a focusing device for a compact and portable beam projector.

2. Description of the Related Art

A beam projector generally refers to a device for implementing an image on a display device, and transmitting light generated from an additional light source into a display device and projecting the transmitted light on a screen to provide the image. The light transmitted through the display device can be expanded through a lens assembly and the focus of light can be adjusted based on a distance of the lens from a screen.

Such a beam projector can easily control a size of an image. However, as the image is magnified, the image quality deteriorates and the colors are not accurately depicted in some lighted areas. Some of these disadvantages have been overcome by recent technology for manufacturing the display device and the lens system.

Since the beam projector is an expensive device, it has been almost exclusively used in conferences, report presentations, assemblies, or public events in such places as a large conference room, and has not enjoyed much use by the typical consumer. However, a home beam projector has been recently commercialized, and with the development of information devices such as portable terminals, an effort has been made to commercialize a highly portable and pocket-sized beam projector.

Image quality through the beam projector greatly depends on the quality of the display device, light source, and lens system. However, the quality of an image implemented through a pre-manufactured beam projector depends on an appropriate distance between a screen and a beam projector and the focus adjustment in an installation state.

There is a limitation in installing a focusing device in a beam projector mounted on a portable terminal or a pocket-sized beam projector. That is, since the beam projector is conventionally used in such large areas as a conference room, the focusing device is constructed to be remotely controlled using a gear or motor. However, it is exceedingly difficult to install such a focusing device for pocket-sized portability purposes or retro-fit such a focusing device on an already manufactured beam projector.

SUMMARY OF THE INVENTION

Accordingly, the present invention has been made to solve the above-stated problems occurring in the prior art, and an object of the present invention is to provide a focusing device for enhancing the compactness of a beam projector.

The present invention provides a focusing device in which the focusing can be performed in a compact beam projector so that a quality of an image implemented through a portable beam projector can be improved.

The present invention provides a focusing device in which fine focusing can be performed in a general beam projector so that a high definition image can be clearly implemented.

In accordance with the present invention, there is provided a focusing device for a beam projector, including an adjustment member mounted on a housing of the beam projector to be linearly movable, a pivoting member rotatably mounted on the housing, a link member extending from the pivoting member at a point separated from a rotation axis of the pivoting member, and a lens assembly mounted to be linearly movable within the housing while interfering with the pivoting member, in which the link member rotates the pivoting member according to the linear movement of the adjustment member and the lens assembly linearly moves within the housing according to the rotation of the pivoting member.

The adjustment member includes a movement member that linearly moves in an internal surface of the housing and an adjustment grip fixed to the movement member and installed on an external surface of the housing.

The adjustment member further includes a driving slot extending while being inclined with respect to a movement direction of the adjustment member, and the link member includes a driving protrusion received in the driving slot to be linearly movable, and the driving protrusion linearly moves in the driving slot according to the linear movement of the adjustment member to rotate the pivoting member.

The adjustment member also includes a movement member linearly moving in an internal surface of the housing and a driving slot formed on the movement member and extending while being inclined with respect to a movement direction of the movement member, and the link member further includes a driving protrusion received in the driving slot to be linearly movable, and the driving protrusion linearly moves in the driving slot according to the linear movement of the adjustment member to rotate the pivoting member.

The focusing device for the beam projector further includes a driving hole formed at a connection part of the rotation axis and the link member on the pivoting member and a follower protrusion extending from the lens assembly to be received in the driving hole. If the pivoting member rotates, the follower protrusion interferes with an inner wall of the driving hole so that the lens assembly linearly moves.

The focusing device for the beam projector further includes a rotation protrusion formed on the housing and a rotation hole formed at one end of the pivoting member, and the rotation protrusion is assembled with the rotation hole to support the rotation of the pivoting member. The link member extends from another end of the pivoting member.

The focusing device for the beam projector further includes a driving hole formed on the pivoting member and a follower protrusion extending from the lens assembly to be received in the driving hole, and the driving hole is positioned between one end and another end of the pivoting member. If the pivoting member rotates, the follower protrusion interferes with an inner wall of the driving hole so that the lens assembly linearly moves.

Such a driving hole has the shape of a long hole extending along a longitudinal direction of the pivoting member.

The adjustment member further includes a guide rib extending along the linear movement direction of the adjustment member, and a movement member linearly moving in an internal surface of the housing and an adjustment grip fixed to the movement member and installed on an external surface of the housing, in which the guide rib is formed on the movement member. The guide rib is engaged with an internal surface of the housing to guide a linear movement of the adjustment member.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS

Hereinafter, embodiments of the present invention will be described with reference to the accompanying drawings. In the following description, a detailed explanation of known related functions and constitutions may be omitted for the sake of clarity and conciseness.

Figure 1:
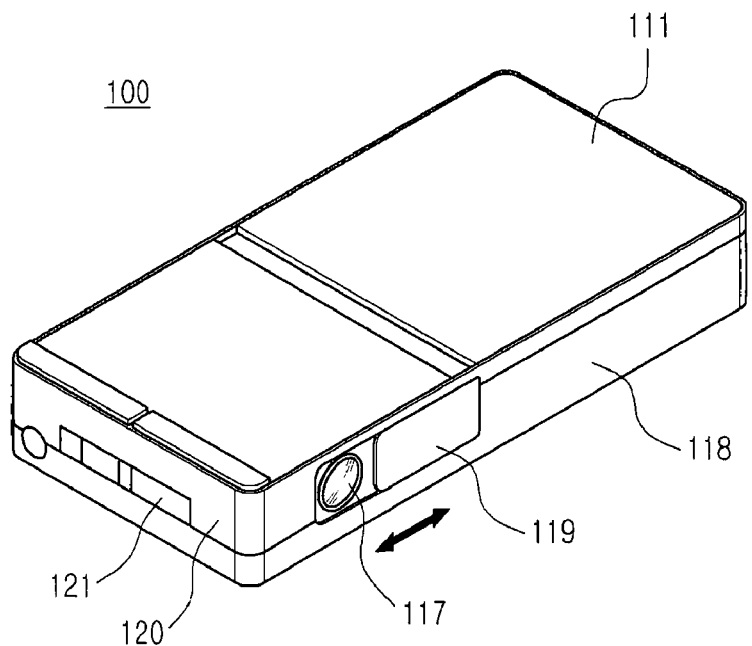
FIG. 1 illustrates a beam projector including a focusing device according to the present invention.

FIG. 1 illustrates a portable beam projector 100 including a focusing device 102 (shown in FIG. 2) according to the present invention. As shown in FIG. 1, the beam 25 projector 100 includes an image emitting window 117 in a lateral surface 118 of a housing 111 and an adjustment grip 121 in another lateral surface 120 adjacent to the lateral surface 118. A lens assembly 115 (shown in FIG. 3) is installed in an internal surface of the projector 100 where the window 117 is installed. The housing 111 includes a slide cover 119 for protecting the window 117 or lens assembly 115 during the carrying of the beam projector 100. The beam projector 100 can include a battery pack therein for portable use.

The slide cover 119 can linearly move in a horizontal direction shown by the arrow, to open/close the window 117. An elastic member including one end supported by the housing 111 and the other end supported by the slide cover 119 to supply a driving force is installed in the slide cover 119 for ease of opening/closing of the slide cover 119.

Figure 2:
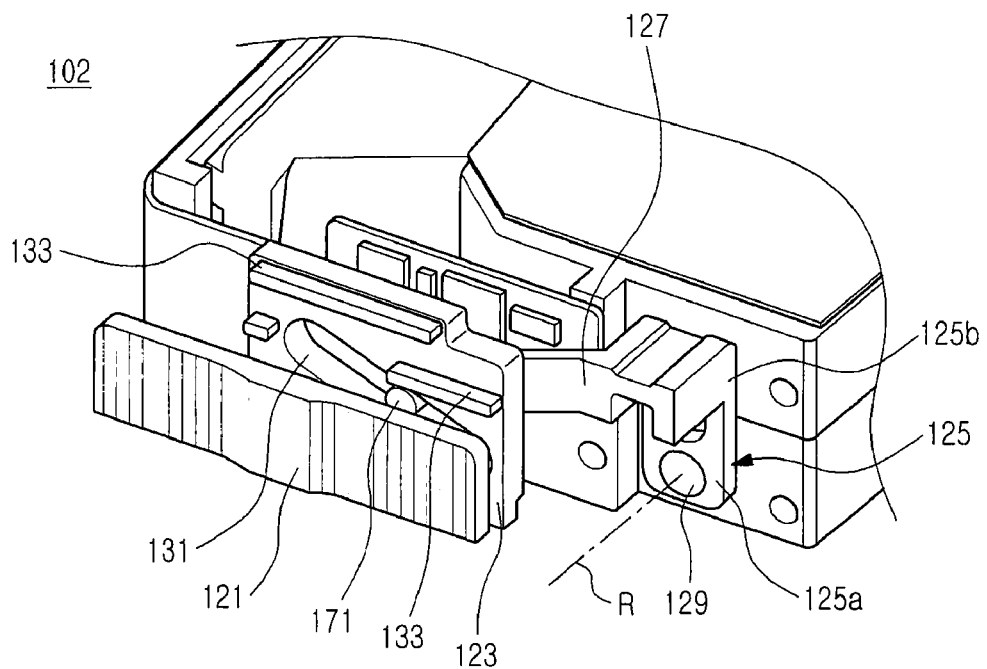
FIG. 2 is a perspective view of the focusing device of FIG. 1.

FIG. 2 is a perspective view of the focusing device of FIG. 1. Referring to FIG. 2, the focusing device 102 linearly moves the lens assembly 115 using an adjustment member, a pivoting member 125, and a link member 127.

The adjustment member includes the adjustment grip 121 and a movement member 123 and is installed to linearly move along a beam direction of the lens assembly 115 on the housing 111. The movement member 123 is installed in an internal surface of the housing 111 and the adjustment grip 121 is installed in an external surface of the housing 111, as previously described.

The adjustment grip 121 is fastened by a fastening member (not shown) to be fixed to the movement member 123. The fastening member passes through the internal and external surfaces of the housing 111 to attach the adjustment grip 121 and the movement member 123, and the housing 111 includes a slot (not shown) that creates a space allowing the fastening member to move during the movement of the adjustment member. The assembly structure of the adjustment grip 121 and the movement member 123 can be easily understood by those skilled in the art even though its detailed description is omitted in the drawings for the sake of conciseness.

In order to guide the linear movement of the adjustment member, the movement member 123 includes a guide rib 133 capable of linearly moving while being engaged with the internal surface of the housing 111. Accordingly, the housing 111 includes grooves corresponding to the guide rib 133 in the internal surface of the housing 111. The aforementioned fastening member and slot can be configured as a structure guiding the linear movement of the adjustment member, but the guide rib 133 is formed as stated in order to achieve stable linear movement of the movement member 123, and the overall adjustment member.

The movement member 123 includes a driving slot 131 so as to adjust the focus of the lens assembly 115. The driving slot 131 extends while being inclined with respect to a movement direction of the adjustment member and its operation will be described in more detail with reference to FIGS. 3 to 5.

The pivoting member 125 is integrally formed with the link member 127, but the pivoting member 125 and the link member 127 are separately manufactured and assembled with each other. The pivoting member 125 is rotatably installed on the housing 111 and the link member 127 is linked with the adjustment member to rotate the pivoting member 125 according to the linear movement of the adjustment member.

The pivoting member 125 includes a rotation hole (not shown) in one end 125a and the housing 111 includes a rotation protrusion 129 corresponding to the rotation hole. That is, the rotation protrusion 129 is assembled with the rotation hole to form a rotation axis R of the pivoting member 125, which is supported by the rotation protrusion 129 to rotate on the housing 111.

The link member 127 extends from the other end 125b of the pivoting member 125, at a point separated from the rotation axis R. As one end of the pivoting member 125 is rotatably assembled with the housing 111, if the position of the link member 127 that is assembled or integrally formed with the pivoting member 125 is changed, the pivoting member 125 rotates to a position corresponding to the link member 127. The link member 127 includes a driving protrusion 171 in an end to be received in the driving slot 131.

The driving slot 131 is formed while being inclined with respect to the movement direction of the adjustment member and the driving protrusion 171 is received in the driving slot 131 so that by the linear movement of the adjustment member, the driving protrusion 171 moves toward an upper or lower side of the adjustment member. The movement of the driving protrusion 171 causes the rotation movement of the pivoting member 125. The rotation movement of the pivoting member 125 is converted into a linear movement of the lens assembly 115.

Figure 3:
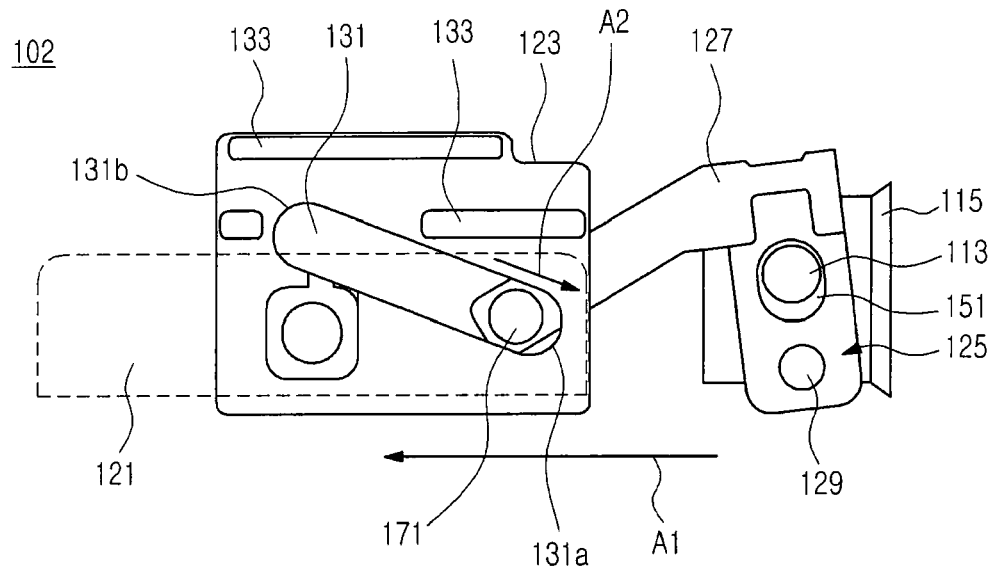
FIGS. 3 to 5 illustrate an operation of the focusing device of FIG. 2.
Figure 4:
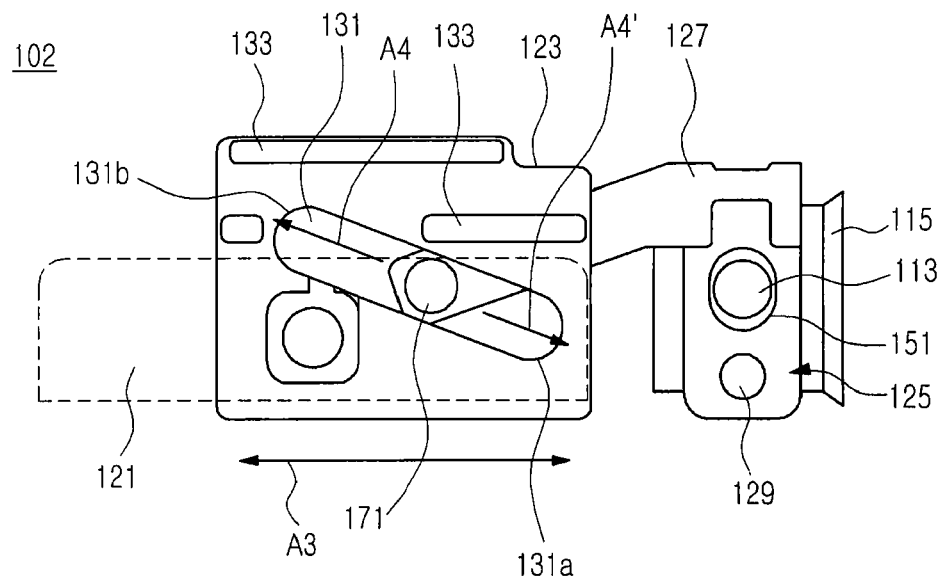
Figure 5:
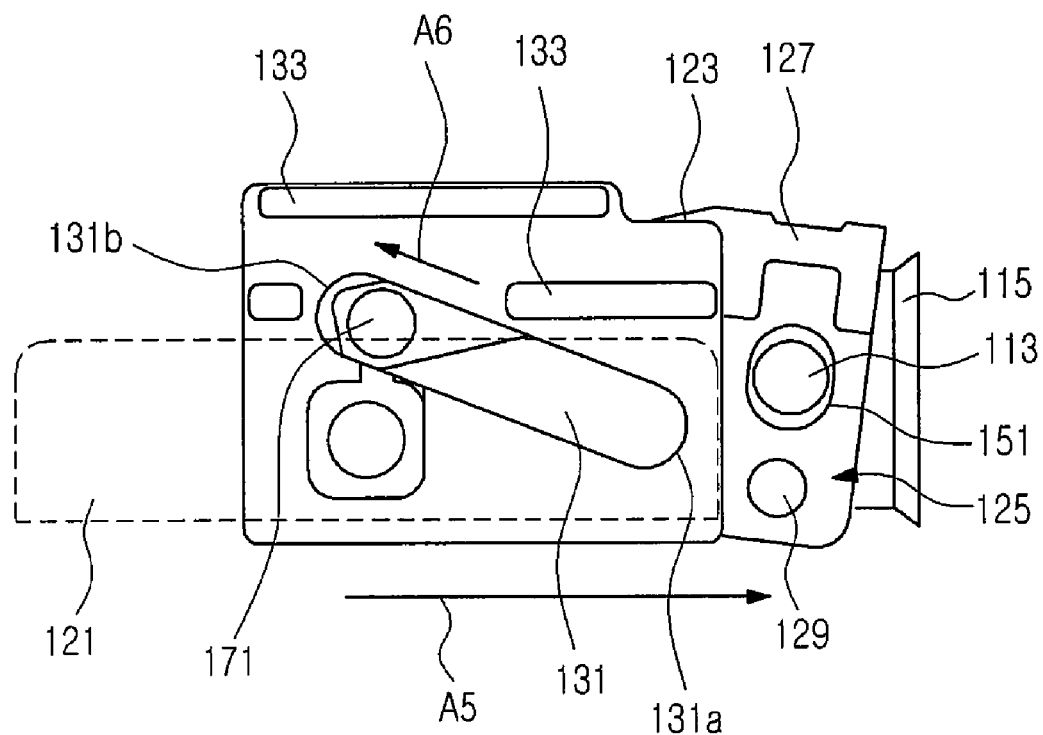

In particular, FIGS. 3 to 5 illustrate an operation of the focusing device of FIG. 2. As shown in FIGS. 3 to 5, the lens assembly 115 includes a follower protrusion 113 in an outer circumferential surface of the lens assembly 115 and the pivoting member 125 includes a driving hole 151.

The driving hole 151 has a long hole shape extending in a longitudinal direction of the pivoting member 125 and at a connection part of the rotation axis R and the link member 127 on the pivoting member 125. That is, the driving hole 151 is located between both ends of the pivoting member 125.

The follower protrusion 113 extends from an outer circumferential surface of the lens assembly 115 to be received in the driving hole 151. Therefore, if the pivoting member 151 rotates, the follower protrusion 113 interferes with an internal wall of the driving hole 151 to linearly move the lens assembly 115. That is, the rotation of the pivoting member 125 causes the linear movement of the lens assembly 115, which enables the focusing operation of the beam projector 100.

As the pivoting member 125 rotates, the driving hole 151 pivots a periphery of the rotation axis R to change a height of the driving hole 151 with respect to the adjustment member, but the lens assembly 115 can only move linearly. If the driving hole 151 is formed only in a circle shape, it may apply excessive force to the follower protrusion 113 such that the lens assembly 115 can only move linearly. Therefore, the driving hole 151 is formed in a long hole shape so that even if there is a change in the height of the driving hole 151, the space capable of receiving the follower protrusion 113 is more secured, thereby preventing the force application to the follower protrusion 113.

Therefore, in the focusing device 102 configured as described above, the linear movement of the adjustment member causes the height change of the driving protrusion 171 formed on the link member 127 to rotate the pivoting member 125 and the rotation of the pivoting member 125 linearly moves the follower protrusion 113, and ultimately the lens assembly 115.

The range of the height change of the driving protrusion 171 is determined based on the inclined angle and length of the driving slot 131, which determines the displacement of the link member 127 and the range of the rotation angle of the pivoting member 125. That is, the greater the inclined angle of the driving slot 131, the larger the range of the height change of the driving protrusion 171. The distance between the rotation axis R and the driving protrusion 171 is limited so that the scope does not increase to infinity.

The range of the height change, can be varied according to a size of the link member 127, a length of the pivoting member 125, and a length of the driving slot, and the particular value can be appropriately set by those skilled in the art during the design of a product and a movement range for focus of the lens assembly 115 in manufacturing the actual product.

Further, the range of the linear movement of the lens assembly 115 is determined by the range of the rotation angle of the pivoting member 125 and the distance between the rotation axis R and the driving hole 151, more particularly, the height difference between the rotation axis R and each location of the follower protrusion 113. That is, if the pivoting member 125 rotates within the same angle range, as the follower protrusion is located away from the height of the location of the rotation axis R, the range of the linear movement of the lens assembly 115 becomes large.

FIG. 3 illustrates the state where the adjustment grip 121 recedes (in the direction of arrow A1) and the lens assembly 115 (not shown) recedes in the direction of the light source or display device (not shown). The driving protrusion 171 moves toward one end of the driving slot 131 (in the direction of arrow A2) during the recession of the adjustment grip 121 and is located at the lowest position within the movement range of the adjustment member. The pivoting member 125 is in a state of rotation while being inclined in a left surface about the rotation protrusion 129.

FIG. 4 illustrates the state where the adjustment member 121 moves so that the driving protrusion 171 ascends to a center position in comparison with FIG. 3. According to the change of the height of the driving protrusion 171, the pivoting member 125 also rotates from the state shown in FIG. 3 in a clockwise direction. The adjustment grip 121 can move in a left and right direction (in the direction of arrows A3) and the driving protrusion 171 moves toward one end or the other end of the driving slot 131 (in the directions of arrows A4 and A4') according to the movement direction of the adjustment grip 121.

FIG. 5 illustrates the state where the adjustment grip 121 forward moves so that the driving protrusion 171 moves to be adjacent to the other end of the driving slot 131. During the forward movement of the adjustment grip 121 in the direction of arrows A5, the driving protrusion 171 moves to be adjacent to the other end of the driving slot 131 along the extending direction of the driving slot 131 (in the direction of arrow A6). Therefore, the driving protrusion 171 moves to a higher position than that shown in FIGS. 3 and 4 and the pivoting member 125 further clockwise rotates from the position shown in FIGS. 3 and 4. Therefore, the lens assembly 115 moves away from the light source or display device.

When compared with the range of the linear movement of the adjustment member, it can be seen that the range of the rotation angle of the pivoting member 125 is further decreased by the inclination angle of the driving slot 131 and the structure of the link member 127. Further, as the driving hole 151 is located between both ends of the pivoting member 125, it can be seen that the movement range of the lens assembly 115 further decreases in comparison with the rotation range of the pivoting member 125.

That is, even if a user substantially moves the adjustment member, the movement distance of the lens assembly 115 is small. Therefore, if the focusing device 102 is applied to the general beam projector, it is useful for efficiently enjoying a high definition image. Further, by using the focusing device 102, the focusing function can be provided while sufficiently maintaining the portability of the portable terminal mounting the beam projector or the portable beam projector.

Accordingly, the focusing device of the beam projector constructed as above linearly moves the adjustment member to rotate the pivoting member, and linearly moves the lens assembly as much as the rotation of the pivoting member. The link member extended from the pivoting member is used so that the movement distance of the lens assembly is shorter in comparison with the movement distance of the adjustment member, thereby achieving fine focusing. Therefore, the focusing device according to the present invention is applied to the general beam projector for implementing a high definition image and can adjust the focusing distance without using a gear or motor so that the beam projector can be mounted on the portable terminal or the beam projector itself can be compact.

While the present invention has been shown and described with reference to certain embodiments and drawings thereof, it will be understood by those skilled in the art that various changes in form may be made therein without departing from the spirit and scope of the invention as defined by the appended claims.

What is claimed is:
1. A focusing device for a beam projector, comprising:
an adjustment member mounted on a housing of the beam projector to be linearly movable on the housing;
a pivoting member rotatably mounted on the housing;
a link member extending from the pivoting member at a point separated from a rotation axis of the pivoting member; and
a lens assembly mounted to be linearly movable within the housing while interfering with the pivoting member,
wherein the link member rotates the pivoting member according to the linear movement of the adjustment member and the lens assembly linearly moves within the housing according to the rotation of the pivoting member,
wherein the adjustment member comprises a driving slot extending while being inclined with respect to a movement direction of the adjustment member and the link member comprises a driving protrusion received in the driving slot to be linearly movable, and the driving pro- trusion is linearly movable in the driving slot according to the linear movement of the adjustment member to rotate the pivoting member.

2. The focusing device for the beam projector as claimed in claim 1, wherein the adjustment member comprises a movement member that is linearly movable in an internal surface of the housing and an adjustment grip fixed to the movement member and installed on an external surface of the housing.

3. The focusing device for the beam projector as claimed in claim 1, wherein the adjustment member comprises a movement member that is linearly movable in an internal surface of the housing and the driving slot is formed on the movement member.

4. The focusing device for the beam projector as claimed in claim 1, further comprising:
a driving hole formed on the pivoting member between the rotation axis and the link member; and
a follower protrusion extending from the lens assembly to be received in the driving hole,
wherein if the pivoting member rotates, the follower protrusion interferes with an inner wall of the driving hole so that the lens assembly linearly moves.

5. The focusing device for the beam projector as claimed in claim 1, further comprising:
a rotation protrusion formed on the housing; and
a rotation hole formed at one end of the pivoting member, wherein the rotation protrusion is assembled with the rotation hole to support the rotation of the pivoting member.

6. The focusing device for the beam projector as claimed in claim 5, wherein the link member extends from another end of the pivoting member.

7. The focusing device for the beam projector as claimed in claim 6, further comprising:
a driving hole formed on the pivoting member; and
a follower protrusion extending from the lens assembly to be received in the driving hole,
wherein the driving hole is positioned between one end and another end of the pivoting member and if the pivoting member rotates, the follower protrusion interferes with an inner wall of the driving hole so that the lens assembly linearly moves.

8. The focusing device for the beam projector as claimed in claim 4, wherein the driving hole is shaped in the manner of a long hole and extends along a longitudinal direction of the pivoting member.

9. The focusing device for the beam projector as claimed in claim 1, wherein the adjustment member comprises a guide rib extending along the linear movement direction of the adjustment member.

10. The focusing device for the beam projector as claimed in claim 9, wherein the adjustment member further comprises:
a movement member that is linearly movable in an internal surface of the housing; and
an adjustment grip fixed to the movement member and installed on an external surface of the housing,
wherein the guide rib is formed on the movement member.

11. The focusing device for the beam projector as claimed in claim 9, wherein the guide rib is engaged with an internal surface of the housing to guide a linear movement of the adjustment member.

* * * * *